(12) United States Patent
Achhra et al.

(10) Patent No.: US 11,210,703 B2
(45) Date of Patent: *Dec. 28, 2021

(54) VIRTUAL REALITY AND AUGMENTED REALITY SYSTEMS AND METHODS TO GENERATE MOBILE ALERTS

(71) Applicant: Visa International Service Association, San Francisco, CA (US)

(72) Inventors: Santosh Lachhman Achhra, Singapore (SG); Sergey Alex Paykis, Belmont, CA (US); Stanislav Igorevich Tsikine, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/036,565

(22) Filed: Sep. 29, 2020

(65) Prior Publication Data

US 2021/0012381 A1     Jan. 14, 2021

Related U.S. Application Data

(63) Continuation of application No. 15/174,626, filed on Jun. 6, 2016, now Pat. No. 10,825,049.

(Continued)

(51) Int. Cl.
*G06Q 30/02* (2012.01)
*G06Q 30/06* (2012.01)
*G06Q 20/32* (2012.01)

(52) U.S. Cl.
CPC ........ *G06Q 30/0261* (2013.01); *G06Q 20/322* (2013.01); *G06Q 20/3224* (2013.01); *G06Q 30/0267* (2013.01); *G06Q 30/0601* (2013.01)

(58) Field of Classification Search
CPC .......... G06Q 30/0261; G06Q 20/3224; G06Q 30/0601; G06Q 30/0267; G06Q 20/322; G06Q 20/321; H04W 4/02
See application file for complete search history.

(56) References Cited

U.S. PATENT DOCUMENTS 7,493,636 B2   2/2009   Kitsukawa et al.
7,970,661 B1   6/2011   Abraham et al.
(Continued)

OTHER PUBLICATIONS

"ShopRite Mobile Scan", ShopRite, retrieved from https://www.shoprite.com/mobilescan.

*Primary Examiner* — Sam Refai
*Assistant Examiner* — Kyle G Robinson
(74) *Attorney, Agent, or Firm* — The Webb Law Firm (57) ABSTRACT

A mobile device may include a location determination device, a mobile application, a plurality of wireless communication devices, and a user interface for the mobile application. The mobile device may be coupled, via wireless connections, with a wearable device to capture identification information of the object and a remote portal to determine whether a data warehouse coupled with the portal stores a predetermined type of data associating the identification information and the mobile device. If so, the mobile device may generate an alert on the mobile device and prompt the user to accept an operation related to the object. If the user accepts the operation, the mobile application may monitor the location of the mobile device and initiate the operation based on the location of the mobile device.

20 Claims, 6 Drawing Sheets

Related U.S. Application Data (60) Provisional application No. 62/173,054, filed on Jun. 9, 2015.

(56) References Cited

U.S. PATENT DOCUMENTS

| | | | |
|---|---|---|---|
| 8,825,081 | B2 | 9/2014 | Arrasvuori et al. |
| 2010/0082445 | A1 | 4/2010 | Hodge et al. |
| 2010/0185514 | A1 | 7/2010 | Glazer et al. |
| 2010/0211469 | A1 | 8/2010 | Salmon et al. |
| 2011/0288918 | A1 | 11/2011 | Cervenka et al. |
| 2012/0078697 | A1 | 3/2012 | Carlson et al. |
| 2012/0191525 | A1 | 7/2012 | Singh et al. |
| 2012/0253914 | A1 | 10/2012 | Black |
| 2012/0271712 | A1 | 10/2012 | Katzin et al. |
| 2012/0310838 | A1 | 12/2012 | Harris et al. |
| 2013/0024371 | A1* | 1/2013 | Hariramani .......... G06Q 20/384 705/41 |
| 2013/0124273 | A1 | 5/2013 | Chhabra |
| 2013/0124287 | A1* | 5/2013 | Bjorn ................. G06Q 30/0215 705/14.23 |
| 2013/0166408 | A1 | 6/2013 | Edwards |
| 2013/0198056 | A1* | 8/2013 | Aldrey ............... G06Q 30/0201 705/38 |
| 2013/0238413 | A1 | 9/2013 | Carlson et al. |
| 2013/0282461 | A1 | 10/2013 | Ovick et al. |
| 2013/0321129 | A1* | 12/2013 | Swenson, Jr. .......... G06Q 10/08 340/8.1 |
| 2013/0325579 | A1 | 12/2013 | Salmon et al. |
| 2013/0346168 | A1 | 12/2013 | Zhou et al. |
| 2014/0006129 | A1 | 1/2014 | Heath |
| 2014/0100997 | A1* | 4/2014 | Mayerle ............. G06Q 30/0276 705/27.2 |
| 2014/0172640 | A1 | 6/2014 | Argue et al. |
| 2014/0187228 | A1 | 7/2014 | Fisher |
| 2014/0258007 | A1 | 9/2014 | Calman et al. |
| 2014/0267399 | A1 | 9/2014 | Zamer |
| 2014/0282162 | A1 | 9/2014 | Fein et al. |
| 2014/0324638 | A1* | 10/2014 | Khalid ................. H04B 5/0025 705/27.1 |
| 2015/0073907 | A1 | 3/2015 | Purves et al. |
| 2015/0170249 | A1* | 6/2015 | Cockcroft .......... G06Q 30/0627 705/26.63 |
| 2015/0206349 | A1* | 7/2015 | Rosenthal ............. G06T 19/006 345/633 |
| 2016/0328790 | A1* | 11/2016 | Edwards ........... G06Q 30/0643 |

\* cited by examiner

VIRTUAL REALITY AND AUGMENTED REALITY SYSTEMS AND METHODS TO GENERATE MOBILE ALERTS

CROSS-REFERENCE TO RELATED APPLICATIONS

The present application is a continuation of U.S. patent application Ser. No. 15/174,626, filed Jun. 6, 2016, which claims the benefit of U.S. Prov. Pat. App. No. 62/173,054, filed Jun. 9, 2015, the disclosures of which are hereby incorporated by reference in their entireties.

The present application relates U.S. Pat. App. Pub. No. 2010/0211469, U.S. Pat. App. Pub. No. 2011/0288918, U.S. Pat. App. Pub. No. 2012/0078697, U.S. Pat. App. Pub. No. 2012/0191525, U.S. Pat. App. Pub. No. 2012/0253914, U.S. Pat. App. Pub. No. 2012/0310838, U.S. Pat. App. Pub. No. 2013/0124273, U.S. Pat. App. Pub. No. 2013/0282461, U.S. Pat. App. Pub. No. 2013/0325579, the entire disclosures of which applications are hereby incorporated herein by reference.

FIELD OF THE TECHNOLOGY

At least some embodiments discloses in the present application relate to virtual reality and augmented reality in general and more particularly but not limited to mobile alerts generated in connection with virtual reality and augmented reality, user interactions in virtual reality and augmented reality, and location dependent processing in the mobile devices.

BACKGROUND

Virtual reality is a computer technology that provides a computer generate virtual, three-dimensional environment in which users may interact with virtual objects and/or communicate with each other. Virtual realities may provide various sensory experiences, such as sight, touch, hearing, and/or smell.

Augmented reality is a related computer technology that projects computer generated virtual environment onto a view of the real physical environment as perceived directly or indirectly by users such that the reality of the physical world appears to be augmented by the virtual content generated by computers. The virtual content can be provided in the form of sensory input such as sound, video, graphics, text, etc.

Virtual reality and augmented reality have many applications. For example, U.S. Pat. App. Pub. No. 2013/0166408, entitled "Virtual Reality System Including Smart Objects," discloses a virtual reality simulation of a shopping environment, in which smart objects representing store shelves may be used to examine user attention to promotional materials associated with a shelf, such as a coupon dispenser.

For example, U.S. Pat. App. Pub. No. 2014/0172640, entitled "Augmented Reality Shopping Game," discloses an augmented reality program to keep kids in certain parts of a retail store and away from exits and to send alerts to adult and store personnel if a child gets close to a restricted area.

U.S. Pat. No. 8,825,081, entitled "Personal Augmented Reality Advertising," discloses an augmented reality that detects proximity between a participant's mobile device and a viewer's mobile device and a match between the biometric data of the participant and an image captured from a sensor of the viewer's mobile device. In response, the captured image and an advertisement presented with the captured image are presented in the viewer's mobile device.

U.S. Pat. No. 7,493,636, entitled "Method and Apparatus for Providing Electronic Coupons", discloses a system that has coupon modes configured to alert a viewer when coupon information is available for an item by superimposing over the broadcast of a television program marks indicating the availability of coupon data.

U.S. Pat. App. Pub. No. 2014/0006129, entitled "Systems and Methods for Mobile and Online Payment Systems for Purchases Related to Mobile and Online Promotions or Offers Provided using Impressions Tracking and Analysis, Location Information, 2d and 3D Mapping, Mobile Mapping, Social Media, and User Behavior and Information for Generating Mobile and Internet Posted Promotions or Offers for, and/or Sales of, Products and/or Services in a Social Network, Online or via a Mobile Device," discloses coupon alerts, where a video or audio alert or text message is provided in connection with a mobile, wireless and internet posted, location based, customized promotions or offers or daily deal coupons or daily deal coupons aggregation for products or services, daily deal coupons, daily deal coupons aggregation which are displayed in connection with a social network, website or online or mobile commerce.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
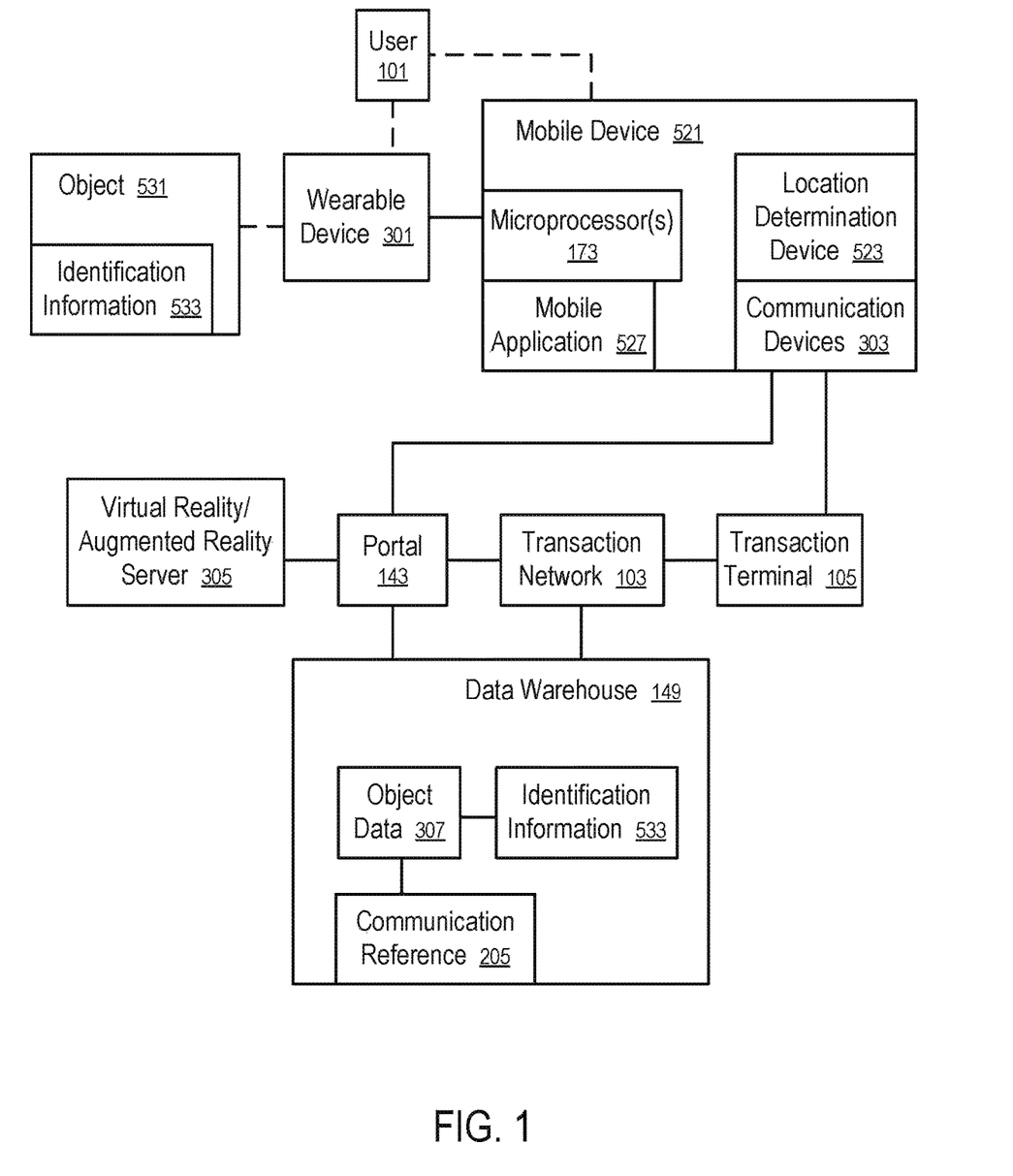
FIG. 1 shows a system to generate a mobile alert according to one embodiment.

FIG. 1 shows a system to generate a mobile alert according to one embodiment.

In FIG. 1, the system includes a mobile device (521) and a wearable device (301) of a user (101). The mobile device (521) includes a plurality of communication devices (303) configured to communicate with the wearable device (301), a transaction terminal (105) and a communication portal (143) that is coupled with a transaction network, a data warehouse (149), and a virtual reality/augmented reality server (305).

For example, the mobile device (521) is configured to use one of the communication devices (303) to communicate with the wearable device (301) via a wireless connection, such as a wireless personal area network connection, or a wireless local area network connection. In some instances, a wired connection can also be used to connect the wearable device (301) and the mobile device (521).

The wearable device (301) includes input/output devices to present a virtual reality and/or augmented reality and/or receive user inputs to the virtual reality and/or augmented reality. For example, the wearable device (301) may include a head-mount display unit to virtually present a virtual reality environment, or a pair of glasses with an integrated display that projects virtual content onto the field of view, as seen through the pair of glasses to augment the reality, with the virtual content. For example, the wearable device (301) may include a head-mount camera that captures a field of view at the current location of the user and a head-mount display that presents an augmented reality environment that includes the field of view captured by the camera and virtual content projected in the field of view captured by the camera.

In FIG. 1, the mobile device (521) includes a mobile application (527) configured to be executed by one or more microprocessors (173) of the mobile device (521). At least some of the virtual objects in the virtual reality environment, or augmented reality environment, are generated and/or provided by the mobile application (527).

In FIG. 1, the mobile device (521) includes a location determination device (523) configured to determine the current location of the mobile device (521) (e.g., in a physical world, in the virtual reality world, in the augmented reality world). For example, the mobile application (527) of one embodiment is configured to map the current location of the mobile device (521) in the real world into a location of the user (101) in the virtual reality environment, or augmented reality environment; and some of the virtual objects in the virtual reality environment, or augmented reality environment, presented via the wearable device (301) are generated and/or provided based at least in part on the location of the user (101) in the virtual reality environment, or augmented reality environment.

In FIG. 1, the wearable device (301) is configured to capture the identification information (533) provided on the object (531) in the virtual reality environment, or augmented reality environment.

For example, the object (531) may be a real object in the real world with the identification information (533) configured on a surface of the object (531) in the form of a bar code, a string of text, etc. The wearable device (301) captures the identification information (533) in a form of an image that is processed by the mobile application to extract the identification information (533), such as the data encoded in the bar code, the text recognized from the string of text, etc.

For example, the object (531) may be a virtual object in a virtual reality world, or an augmented reality world, hosted on the server (305) (or a separate server in communication with the mobile device (521)). The identification information (533) can be provided in the form of an image rendered on a surface of the virtual object, or data embedded in the virtual object. The wearable device (301) (or the mobile application (527)) is configured to capture the identification information (533) from the rendered image of the virtual object, or from the server (305) (or a separate server hosting the virtual object).

In FIG. 1, the data warehouse (149) stores object data (307) related to the object (531). The object data (307) is stored in association with the identification information (533) of the object (531) and in association with a communication reference (205) of the mobile device (521) (and/or other identifiers of the user (101) of the mobile application (527)). The communication reference (205) allows the portal (143) to initiate a communication configured to be transmitted to the mobile device (521) (e.g., via a telecommunications network, such as a cellular communications network).

In FIG. 1, after the mobile application (527) obtains the identification information (533) via the wearable device (301), the mobile application (527) transmits a communication to the portal (143) via a wireless local area network connection or a wireless wide area network connection and/or other network connections. The communication contains the identification information (533) and is configured to cause the portal (143) to determine whether the data warehouse (149), coupled with the transaction network (103), stores the object data (307) that is associated with the identification information (533).

If the portal (143) determines that the data warehouse (149) stores the object data (307) in association with the identification information (533), the portal (143) uses the communication reference (205) to send an alert to the mobile device (521) (e.g., via a cellular communications network). The alert communication from the portal (143) causes the mobile device to provide an alert to the user (101) of the mobile device (521) via the user interface of the mobile device (521) and/or the wearable device (301).

For example, the alert can be presented via a sound or audio clip played on the mobile device (521). Alternatively or in combination, the alert can be presented via a notification icon presented on a display device of the mobile device (521).

The mobile application (522) of one embodiment is configured to recognize the alert communication from the portal (143) and generate an indicator overlaid on the object (531). The user (101) may interact with the indicator via the wearable device (301) (e.g., through an operation of a data glove or a voice command) in the virtual reality environment, or the augmented reality environment, implemented using the wearable device (301). Alternatively, the user (101) may interact with the notification presented on a user interface of the mobile device (521).

In at least some embodiments, a user interaction with the indicator/notification causes the mobile device (521) to generate a transaction in the transaction network (103) for the object (531) based on a location determined by the location determination device (523).

For example, after a confirmation is received from the user (101) in relation with interaction with the indicator/notification, the mobile application (527) monitors the location determined by the location determination device (523), which may be a location in the real world or a virtual location in a virtual reality hosted on the server (305). When the location indicates that the user (101) is entering a predetermined area, or leaving a predetermined area, the mobile application (527) transmits a communication to the portal (143), or another portal connected to the transaction network (103), to generate a transaction for the object (531).

For example, after a confirmation is received from the user (101) in relation with interaction with the indicator/notification, the mobile application (527) monitors the location determined by the location determination device (523), which may be a location in the real world or a virtual location in a virtual reality hosted on the server (305). When the location indicates that the user (101) is performing a transaction with the transaction terminal (105) within a predetermined geographical area associated with the location of the object (531) where the interaction with the indicator/notification occurs, the mobile application (527) is configured to use one of the communication devices (303) to inform the transaction terminal (105) of the inclusion of the object (531) in the transaction. The transaction network (103) is configured to process the transaction using the object data (307).

For example, an offer specific to an item to be purchased is associated with a payment account in an electronic payment processing network. During virtual reality interaction with the item for online shopping, the mobile application recognizes the item and generates an alert to the user about the offer applicable to the item. Alternatively, during augmented reality interaction with the item a physical store, identification information provided on the item (e.g., a bar code) is scanned for the mobile application (521) to alert the user about the applicable offer. The mobile application (521) provides an electronic payment processing system with purchase data identifying the purchase of the item and payment data identifying the payment account. The payment processing system uses the payment account to process a payment for the purchase and apply the benefit of the offer to the payment during the processing of the payment.

For example, the mobile device (521) includes: a location determination device (523) configured to determine a current location of the mobile device; at least one microprocessor (173); a memory storing a mobile application (527) configured to be executed by the at least one microprocessor (173); a plurality of wireless communication devices (303); and a user interface for mobile application (527).

The plurality of wireless communication devices (303) are configured to communicate with a wearable device (301) via a wireless personal area network connection, where the wearable device (301) is controlled at least in part by the mobile application (527) via the wireless personal area network connection.

The plurality of wireless communication devices (303) are configured to communicate, via a wireless connection, with a portal (143) positioned at a remote location, where the portal (143) is coupled with a data warehouse (149) storing object data (307) in association with identification information of an object (531).

The plurality of wireless communication devices (303) are configured to communicate, via near field communication, with a transaction terminal (105) disposed at a predetermined location.

In response to the wearable device capturing the identification information of the object disposed at a location, the mobile application (527) transmits a communication to the portal, where the communication includes the identification information (533) and is configured to cause the portal (143) to: determine whether the data warehouse (149) is storing the object data (307) in association with the identification information (533) of the object (531); and in response a determination that the data warehouse is storing the object data (307) in association with the identification information (533) of the object (531), transmitting a response communication from the portal (143) to the mobile application (527) running in the mobile device (521).

In response to the response communication, the mobile application (527) generates via the user interface an alert and generates, through the wearable device (301), a display generated based on the response communication in a virtual reality environment or an augmented reality environment implemented via the wearable device (301).

For example, when the object (531) is a physical object having attached thereon a bar code or a text string, the mobile application (527) is configured to use the wearable device (301) to captured an image of the bar code or the text string via a camera and determined the identification information (533) of the object (531) from the image, in response to a user (101) of the mobile device (521) interacting with the object (531) in an augmented reality environment implemented via the wearable device (301).

For example, when the object (531) is a virtual object projected at a location in the augmented reality environment in the vicinity of the current location of the mobile device (521), the wearable device (301) may capture a screen image of the virtual object and cause the mobile application to determine the identification information (533) from the bar code or text string rendered on a surface of the object (531). Alternatively, the wearable device (301) may cause the mobile application (527) to communicate with an augmented reality server (305) from which the virtual object (531) is obtained to determine the identification information (533).

For example, when the object (531) is a virtual object projected at a location in a virtual reality environment (e.g., based on a location of the mobile device (521)), the wearable device (301) may capture a screen image of the virtual object and cause the mobile application to determine the identification information (533) from the bar code or text string rendered on a surface of the object (531). Alternatively, the wearable device (301) may cause the mobile application (527) to communicate with a virtual reality server (305) from which the virtual object (531) is obtained to determine the identification information (533).

In some embodiments, the object (531) is a virtual object is generated by the mobile application (527) and has identification information (533) known to the mobile application (527).

The mobile application (527) of one embodiment is configured to receive a user response to the alert. In response to the user response, the mobile application (527) is configured to: present, via the user interface of the mobile device (521), an option for accepting an operation related to the object (531); and receive via the user interface a user confirmation to accept the operation.

For example, after the user confirmation is received in the user interface, the mobile application (527) is configured to: detect a communication between the mobile device (521) and the transaction terminal (105); and determine whether or not to transmit the identification information (533) of the object (531) to the terminal (105) based on the current location of the mobile device (521) at the time of the detected communication between the mobile device (521) and the transaction terminal (105).

For example, after the user confirmation is received in the user interface, the mobile application (527) is configured to: monitor the current location of the mobile device (521); and initiate a transaction associated with the terminal in response to the current location of the mobile device being outside a predetermined area associated with the location where the object (531) was disposed at a time the alert (or the confirmation) occurs.

For example, the object data (143) stored in the data warehouse (149) in association with the identification information (533) of the object includes an offer having a benefit; and after a transaction is initiated in the transaction network (103) using an account associated with the object data (307) and/or the communication reference (205), the transaction network (103) provides the benefit of the offer to the transaction in an automated way. Optionally, the alert generated at the mobile device (521) indicates the offer and/or the benefit of the offer, where the alert can be presented on the wearable device (301) and/or the mobile device (521). In some instances, the user (101) may interact with the alert to explore further details of the offer and/or the benefit of the offer.

In at least some embodiments, the wearable device (301) is configured to monitor a field of a view of the user (101). When the wearable device (301) detects a user indication of interest to purchase an item, identified from user interaction with the object (531), the wearable device (301) captures the identification information (533) of the object (531) to cause the alert.

For example, the alert may prompt the user (101) of the mobile device (521) to make a purchase of the object (531); and, in response to a user response to make the purchase via the mobile device, the mobile application (527) stores information identifying the purchase of the object (531). The mobile application (527) determines an identity of a merchant based on the store location in which the object (531) is disposed and/or the identification information (533).

In response to a determination that the current location of the mobile device (521) is moving outside the predetermined geographical area of the store of the merchant, the mobile application (527) generates an online transaction to complete the purchase of the object (531).

In response to a determination that the current location of the mobile device (521) is within the predetermined geographical area of the store of the merchant and the mobile device (521) is making using one of the communication devices (303) to communicate with a transaction terminal (105) to initiate a transaction, the mobile application (527) causes the communication to include the purchase of the object (531) that was confirmed to be purchased by the user (101).

In some cases, coupons (e.g., physical coupons distributed in published magazines with accompanying advertisements) may be used in some of these transactions. These coupons are typically targeted to individual consumers and offer a one-time discount for a single purchase of a good or service. However, consumers often view such coupons as being mundane or dull, and generating significant consumer interest in the coupons is frequently challenging to product marketers.

Figure 5:
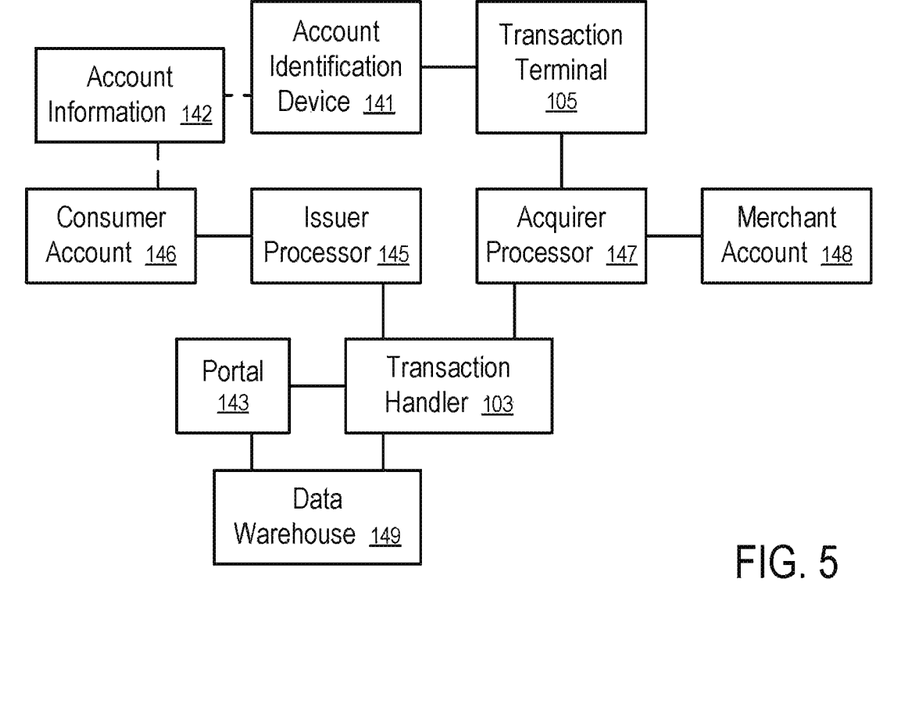
FIG. 5 shows an electronic payment processing network according to one embodiment.

In one embodiment, a user (101) is provided with a mobile application to scan coupons advertised by manufactures for specific items produced by the manufactures. The coupon codes are recognized and stored in association with a consumer payment account (146) of the user (101) in a data warehouse of a transaction handler (103) of an electronic payment processing network (e.g., a network as illustrated in FIG. 5).

Subsequently, when the user (101) makes the purchase of the item where the coupon is applicable, the user (101) may simply pay for the purchase of the item by presenting the account information (142) of the consumer account (146) of the user via the account identification device (141) to the transaction terminal (105) of the merchant. The electronic payment processing network processes the payment transaction, including the authorization of the transaction in the consumer account (146). During the processing of the payment transaction, the transaction handler determines that the scanned coupon, stored as an offer (186) in association with the consumer account (146), is applicable to the payment transaction and applies the benefit of the offer (186) to the payment transaction.

In one embodiment, the transaction handler determines if the transaction terminal of the merchant has the capability to receive and process real time response from the transaction handler; and if so, the transaction handler is configured to communicate with the transaction terminal to charge the discounted amount to the consumer account (146) in view of the offer (186), instead of the full amount for the item.

In some embodiments, the transaction handler and the transaction terminal perform the transaction to charge the consumer account (146) and then provide a cash-back or statement credit to the consumer account (146) in view of the offer (186).

Examples of systems and methods to apply the benefit of an offer (186) to the payment transaction can be found in U.S. Pat. No. 8,463,706, entitled "Coupon Bearing Sponsor Account Transaction Authorization", U.S. Pat. App. Pub. No. 2011/0125565, entitled "Systems and Methods for Multi-Channel Offer Redemption", U.S. Pat. App. Pub. No. 2013/0246150, entitled "Systems and Methods to Apply the Benefit of Offers via a Transaction Handler", U.S. Pat. App. Pub. No. 2013/0268333, entitled "Systems and Methods to Process Transactions and Offers via a Gateway", U.S. Pat. App. Pub. No. 2015/0134528, entitled "Systems and Methods to Facilitate the Redemption of Offer Benefits in a Form of Third Party Statement Credits", the entire disclosures of which hereby incorporated herein by reference.

For example, a cardholder is provided with a mobile application to scan the coupon code advertised in newspapers, websites etc. using their mobile device or enter the coupon code manually into the mobile application or a website (e.g., portal (143). The mobile application and the portal associate the coupon with one of the payment account the user selects from his/her checkout account. The mobile application is configured to inform/alert the user about expiry and terms and conditions of the coupon which was scanned.

When the user goes to and makes purchase at a store where the coupon is usable, the coupon discount can be applied in a real time mode, or an offline mode.

In one embodiment of a real time mode processing, the POS transaction terminal of the merchant communicates with the transaction handler during authorization of payment transaction. The transaction handler determines that there is coupon associated with the payment account of the user the merchant/product being purchased and then immediately applies the coupon discount to the transaction and charge the price after the discount is applied to the payment account of the user. The transaction handler communicates the application of the coupon to the payment transaction to the POS transaction terminal in real-time, which prints the receipt of the value charged after discount.

In one embodiment of an offline mode processing, the POS transaction terminal is not required to be capable of communicating with the transaction handler in real time in processing the coupon offer. When the user makes the purchase, the transaction messages will be sent to the transaction handler in the electronic payment processing network where authorization will be performed and the full amount will be charged to the consumer account; and then a cash-back of the discounted coupon amount will be provided to the user almost immediately (or after the settlement of the transaction). The user will see two transactions on the statement: one is a full amount being charged and another will be the discounted coupon amount being returned to cardholder.

In one embodiment, an additional discount is provided for the redemption of the offer at a transaction terminal that is not capable of supporting the real time mode processing. For example, 20$ off Coupon at POS terminals supporting real-time feedback and 25$ off using statement credits on same coupon if redeemed through POS terminals not capable of receiving real-time feedback.

In one embodiment, the offer is at a merchant level and not at product level (e.g., the determination of whether the offer is applicable does not depend on the particular product that is being purchased). In another embodiment, the offer is based at least in part the identification of the particular product that is being purchased.

In one embodiment, when an offer is presented to the user in an electronic media, the mobile application is configured to extract the identification information of the offer without requiring the user to scan the offer, or take a photo image of the offer.

In one embodiment, the mobile application is further configured to provide a mobile alert to the user when the user is shopping online via virtual reality and/or the offline via augmented reality.

For example, during virtual reality online purchase, if the user selects an item that has an applicable coupon, a mobile application is configured to provide an alert to the user about the applicable coupon. During augmented reality in store purchase, a user device, such as Google Glass, can be used to scan a bar code and identify the product of interest to the user and communicate with the mobile application to alert the user about the applicable coupon.

In one embodiment, the mobile application is configured with a mobile wallet to process the payment for the items selected for purchase via virtual reality online purchase and/or augmented reality offline purchase. The mobile application is configured to communicate the purchase details and payment information to the electronic payment processing network, such that benefit of the offer is applied to the payment transaction during the authorization of the payment transaction.

Figure 2:
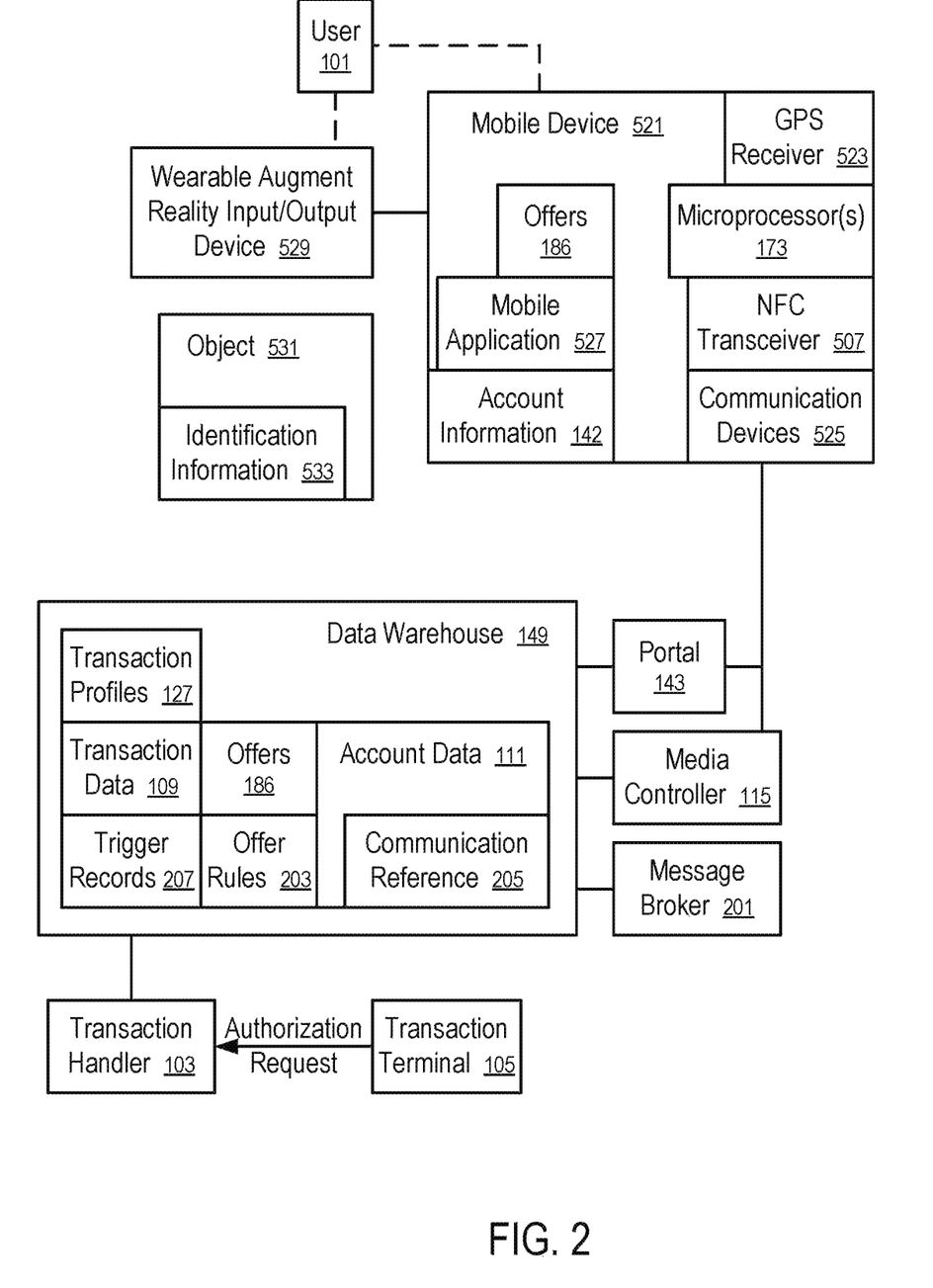
FIG. 2 shows an augmented reality system configured to generate a mobile alert according to one embodiment.

FIG. 2 shows an augmented reality system configured to generate a mobile alert according to one embodiment.

In FIG. 2, a mobile device (521) is configured with a GPS receiver (523) to determine its position, a microprocessor(s) to run mobile application (527), a near field communication (NFC) transceiver (507) to communicate with transaction terminal (105) and communication devices (525) to communicate with portal (143) and the wearable augmented reality input/output device (529).

For example, the wearable augmented reality input/output device (529) of one embodiment include a pair of glasses having an integrated display configured to overlay images and/or text over the field of view of the pair of glasses. The wearable augmented reality input/output device (529) includes a camera to capture the images of the field of view of the pair of glasses. The wearable augmented reality input/output device (529) may further include a microphone to receive voice command from the user, and/or a button to receive user input.

For example, the communications device (525) may communicate with the wearable augment reality input/output device (529) via a personal area network (e.g., Bluetooth) and with the portal (143) and/or the media controller (115) via a wireless local area network (e.g., WiFi) or a wireless wide area network (e.g., cellular communications).

In one embodiment, when the camera of the wearable augmented reality input/output device (529) detects an object (531) having the identification information (533) (e.g., a bar code, or an identification string), the mobile application (527) is configured to determine if the offer (186) is applicable to the object (531).

For example, the offer (186) may include data identify the applicable objects (531) via a Stock-Keeping Unit (SKU) number, a Universal Product Code (UPC), International Article Number (EAN), Global Trade Item Number (GTIN), Australian Product Number (APN), etc. The identification information (533) may include a bar code representing the corresponding identification number, or a text string showing the identification number of the object (531). When the identification number shown as the identification information (533) presented on the object (531) matches with the corresponding identification number in the offer (186), the mobile application (527) generates a mobile alert informing the user of the applicable offer (186).

For example, the mobile application may display an icon in the wearable augment reality input/output device (529) and overlaying the icon in vicinity of the object (531) in the field of view of the pair of glasses. The user may further request the wearable augment reality input/output device (529) to present further details about the applicable offer. For example, the mobile application may play an audible sound to the user to alert the user about a message identifying the applicable offer (186). For example, the mobile application (527) may generate a notification on the mobile device (521) about the applicable offer (186).

In one embodiment, the mobile application (527) is configured to allow the user to select the object (531) for purchase and/or process the payment for the purchase.

For example, in response to the mobile alert, the user may provide input to the mobile application (527) and/or the wearable augment reality input/output device (529) to purchase the item. The mobile application tracks the objects purchased by the user and processes payments when the mobile device (521) is near the transaction terminal (105) using the NFC transceiver (507), or via a communication with the portal (143) using the communications devices (525).

For example, when the mobile device (521) is moved to the vicinity of the transaction terminal (105) of the merchant, the mobile application (527) uses the NFC transceiver (507) to transmit the purchase details (e.g., the list of items selected for purchase), the account information (142) and the applicable offers (186) to the transaction terminal (105). Thus, instead of having to scan the purchased objects (531) at the checkout location, the mobile application (527) scans the objects (531) at the locations near where the user picks up the objects and reduces the time for customers lining up near the checkout location and/or the congestion at the checkout location.

In one embodiment, the GPS receiver (523) is configured to determine a location of the mobile device (521). When the location of the GPS receiver (523) is outside the premises of the merchant, the mobile application is configured to determine whether the payment for the purchased items have been processed; and if not, the mobile application uses the communication devices (525) to communicate with the portal (143) of the transaction handler (103) (or a portal of the merchant) to process the payment using the account information (142).

In one embodiment, after the mobile application (527) identifies the object (531) for purchase, the mobile application (527) communicates the applicable offer (186) to the portal (525) using the communication devices (525). In response, the portal (143) is configured to generate the trigger record (207) to detect a subsequent payment transaction that is anticipated to be performed in a short period of time. Since the time period between the generation of the trigger record (207) for detecting the transaction applicable to the offer (186) and the actual occurrence of the payment transaction is reduced, the efficiency of the transaction handler (103) is improved.

In one embodiment, the mobile application (527) determines the identity of the merchant of the predicted purchase based on the location of the GPS receiver (523). The mobile application (527) transmits predictions of applicable offers and/or the identification information (533) of the corresponding objects (531) based on user interaction with the wearable augment reality input/output device (529). The mobile application (527) transmits the predicted purchases and/or purchase details to the portal (143) such that when a subsequent payment transaction is made with the merchant within a predetermined period of time, the applicable offers (186) are applied to the corresponding payment transaction, without requiring the transaction terminal (105) to transmit the purchase details to the transaction handler (103) (e.g., via authorization request, or a separate communication connection to the portal (143)). The user may use the mobile device (521), or another account identification device (141), to present the account information (142) to the transaction terminal (105) of the merchant to make the payment and get the benefit of having the offer (186) applied to the payment transaction during the authorization of the payment transaction.

Figure 3:
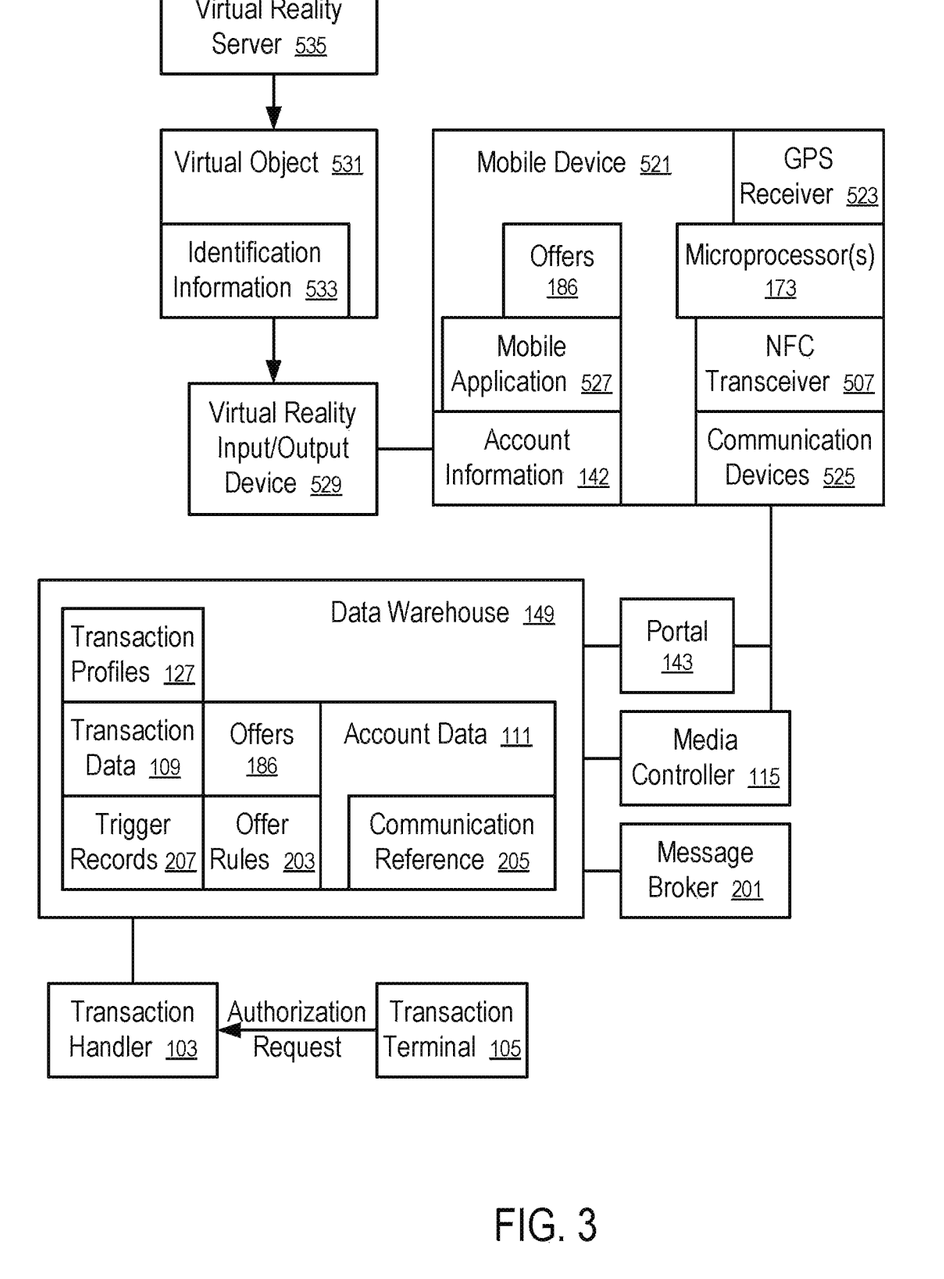
FIG. 3 shows a virtual reality system configured to generate a mobile alert according to one embodiment.

FIG. 3 shows a virtual reality system configured to generate a mobile alert according to one embodiment.

In FIG. 3, the virtual reality server (535) is configured to present the virtual objects (531) representing real objects to be purchased. The virtual objects (531) include the identification information (533) that can be extracted by the virtual reality input/output devices (529) and/or the mobile application (527). Thus, the mobile application does not have to perform a scan and/or optical character recognition (OCR) to determine the identity of the virtual object (531). With the identification information (533), the mobile application (527) can generate the mobile alert, purchase details and/or the payment data in a way similar to the mobile application (527) in the context of augmented reality illustrated in FIG. 2.

In some embodiments, the module is configured in an electronic shopping cart system for online shopping to perform the functions of the virtual reality input/output devices (529). For example, the module is configured to transmit to the mobile application (527) the identification numbers of the objects selected by the user for deposit in the electronic shopping cart; and the mobile application (527) is configured to determine the applicable offers. Before and/or after the user deposits an item in the electronic shopping cart, the mobile application is generated to provide a mobile alert to the user and/or transmit the predicted purchases to the portal (143).

Figure 4:
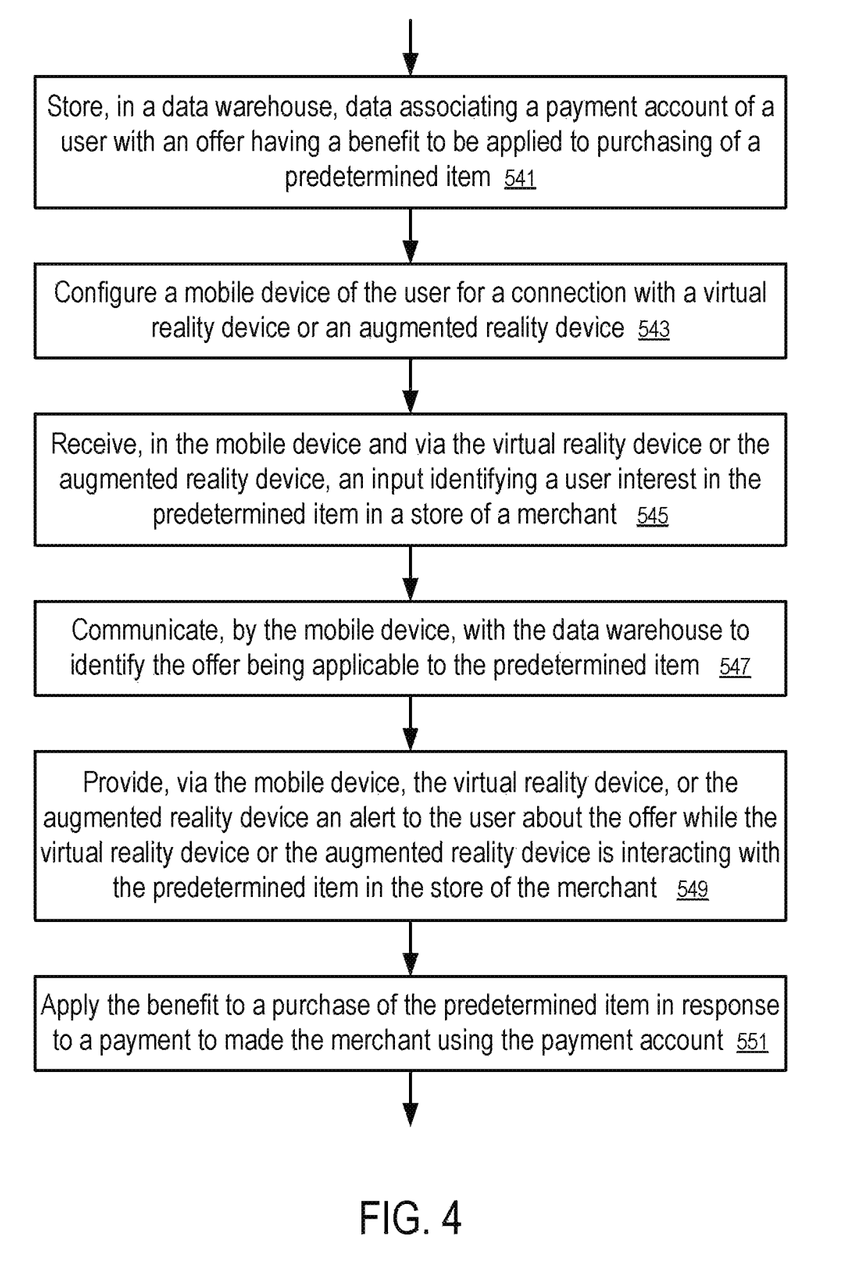
FIG. 4 shows a method to generate a mobile alert according to one embodiment.

FIG. 4 shows a method to generate a mobile alert according to one embodiment. For example, the method of FIG. 4 can be implemented in a system illustrated in FIG. 2 or FIG. 3.

In FIG. 4, a computing apparatus is configured to: store (541), in a data warehouse, data associating a payment account of a user with an offer having a benefit to be applied to purchasing of a predetermined item; configure (543) a mobile device of the user for a connection with a virtual reality device or an augmented reality device; receive, (545) in the mobile device and via the virtual reality device or the augmented reality device, an input identifying a user interest in the predetermined item in a store of a merchant; communicate, (547) by the mobile device, with the data warehouse to identify the offer being applicable to the predetermined item; provide, (549) via the mobile device, the virtual reality device, or the augmented reality device an alert to the user about the offer while the virtual reality device or the augmented reality device is interacting with the predetermined item in the store of the merchant; and apply (551) the benefit to a purchase of the predetermined item in response to a payment to made the merchant using the payment account.

In one embodiment, the computing apparatus includes at least one of: a transaction handler, a message broker (201), a media controller (115), a portal (143) and a data warehouse (149).

FIG. 5 shows an electronic payment processing network according to one embodiment.

In FIG. 5, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

In FIG. 5, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) are separate computers that may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 5, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 5, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 5, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Examples and techniques in one embodiment are provided in U.S. patent application Ser. No. 11/378,215, filed Mar. 16, 2006, assigned U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned U.S. Pat. App. Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Figure 6:
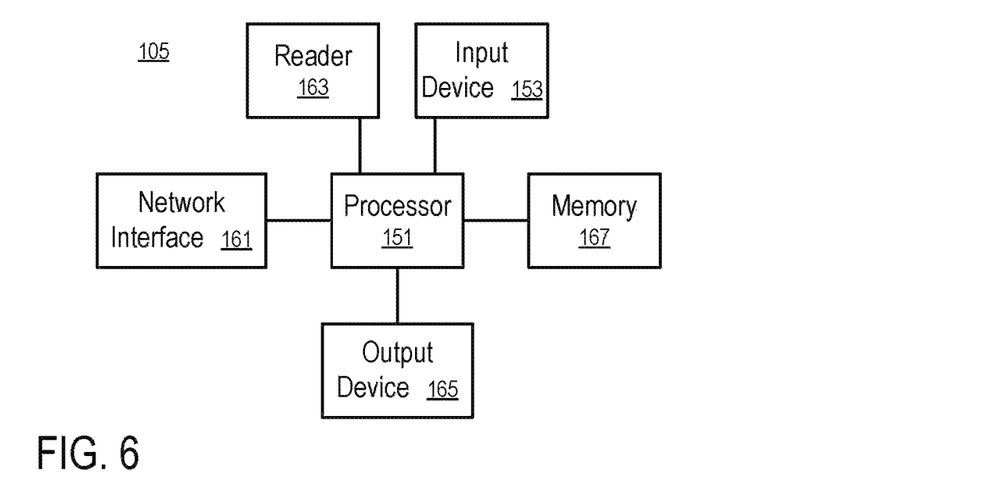
FIG. 6 illustrates a transaction terminal according to one embodiment.

FIG. 6 illustrates a transaction terminal according to one embodiment. The transaction terminal (105) illustrated in FIG. 6 can be used in various systems discussed in connection with other figures of the present disclosure. In FIG. 6, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 6. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 6. For example, in one embodiment, the transaction terminal (105) is an ATM machine, which includes components to dispense cash under certain conditions.

Figure 7:
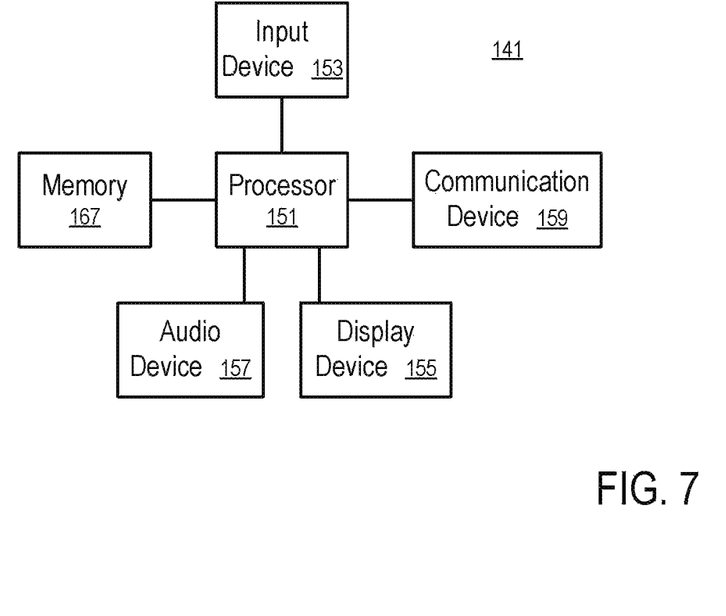
FIG. 7 illustrates an account identifying device according to one embodiment.

FIG. 7 illustrates an account identifying device according to one embodiment. In FIG. 7, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 7, such as a cellular communications subsystem.

In one embodiment, the communication device (159) may access the account information (142) stored on the memory (167) without going through the processor (151).

In one embodiment, the account identification device (141) has fewer components than those illustrated in FIG. 7. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

In one embodiment, a computing apparatus is configured to include some of the components of systems illustrated in various figures, such as the transaction handler (103), the media controller (115), the portal (143), and their associated storage devices, such as the data warehouse (149).

Figure 8:
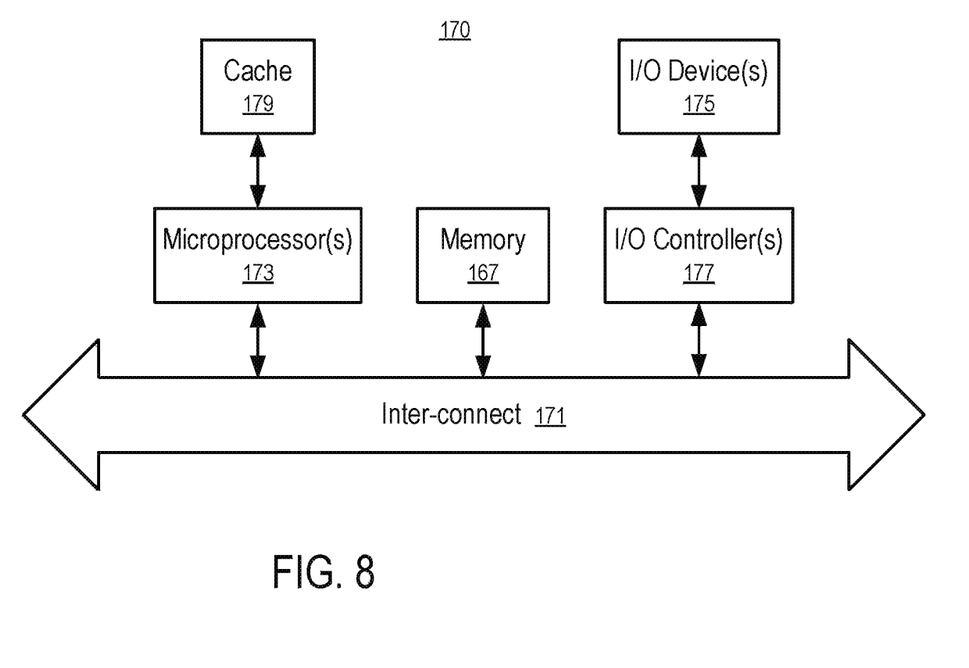
FIG. 8 illustrates a data processing system according to one embodiment.

In one embodiment, at least some of the components such as the transaction handler (103), the transaction terminal (105), the point of interaction, the media controller (115), the portal (143), the issuer processor (145), the acquirer processor (147), and the account identification device (141), can be implemented as a computer system, such as a data processing system (170) illustrated in FIG. 8, with more or fewer components. Some of the components may share hardware or be combined on a computer system. In one embodiment, a network of computers can be used to implement one or more of the components.

Further, the data illustrated in the figures, such as transaction data (109), account data (111), transaction profiles (127), can be stored in storage devices of one or more computers accessible to the corresponding components. For example, the transaction data (109) can be stored in the data warehouse (149) that can be implemented as a data processing system illustrated in FIG. 8, with more or fewer components.

In one embodiment, the transaction handler (103) is a payment processing system, or a payment card processor, such as a card processor for credit cards, debit cards, etc.

FIG. 8 illustrates a data processing system according to one embodiment. While FIG. 8 illustrates various components of a computer system, it is not intended to represent any particular architecture or manner of interconnecting the components. One embodiment may use other systems that have fewer or more components than those shown in FIG. 8.

In FIG. 8, the data processing system (170) includes an inter-connect (171) (e.g., bus and system core logic), which interconnects a microprocessor(s) (173) and memory (167). The microprocessor (173) is coupled to cache memory (179) in the example of FIG. 8.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   storing, in a memory of a mobile device, a mobile application configured to be executed by at least one microprocessor of the mobile device, the mobile device having a location determination device configured to determine a current location of the mobile device, the location determination device comprising a global positioning system (GPS) receiver;
   in response to a wearable device in communication with the mobile device capturing identification information of an object disposed at a first location:
      transmitting, by the mobile application, a first communication to a portal at a remote location, the first communication including the identification information and configured to cause the portal to:
         determine whether a data warehouse coupled with the portal is storing data in association with the identification information of the object, and
         in response to determining that the data warehouse is storing the data in association with the identification information of the object, transmit a second communication from the portal to the mobile application running in the mobile device;

providing, by the mobile application through the wearable device, a display based on the second communication in a virtual reality environment or an augmented reality environment implemented via the wearable device;

monitoring, by the mobile application, the current location of the mobile device based on location data from the GPS receiver;

detecting, by the mobile application, a third communication via near field communication between the mobile device and a transaction terminal at a second location;

determining, by the mobile application, the current location of the mobile device based on the location data from the GPS receiver is within a predetermined geographical area associated with the first location;

determining, by the mobile application, whether or not to transmit the identification information of the object to the transaction terminal at the second location via near field communication based on the current location of the mobile device based on the location data from the GPS receiver being within the predetermined geographical area associated with the first location and being in a vicinity of the transaction terminal at the second location at a time of the third communication; and transmitting, by the mobile device via near field communication, the identification information of the object to the transaction terminal.

2. The method of claim 1, wherein the wearable device implements an augmented reality environment, the wearable device includes a camera, and the wearable device captures the identification information of the object using the camera.

3. The method of claim 2, wherein the object is a physical object.

4. The method of claim 3, wherein the identification information is captured by the wearable device from at least one of a bar code or a text string.

5. The method of claim 2, wherein the object is a virtual object projected at the first location in the augmented reality environment.

6. The method of claim 1, wherein the wearable device implements a virtual reality environment; and
the object is a virtual object in the virtual reality environment.

7. The method of claim 1, wherein the display includes information provided in the second communication.

8. The method of claim 1, further comprising:
in response to the second communication, generating, by the mobile application via a user interface, an alert; and
in response to a user response to the alert:
presenting via the user interface an option for accepting an operation related to the object; and
receiving via the user interface a user confirmation to accept the operation,
wherein detecting the third communication and determining whether or not to transmit the identification information to the transaction terminal are after the user confirmation is received in the user interface.

9. The method of claim 1, wherein the data stored in the data warehouse in association with the identification information of the object includes an offer having a benefit.

10. The method of claim 9, further comprising:
in response to the second communication, generating, by the mobile application via a user interface, an alert,
wherein the wearable device captures the identification information of the object in response to a user indication of interest to purchase an item identified from user interaction with the object and the alert indicates the benefit of the offer.

11. The method of claim 9, wherein the display provided by the mobile application through the wearable device includes an indication of the benefit of the offer.

12. The method of claim 9, wherein the display provided by the mobile application through the wearable device identifies the offer.

13. The method of claim 12, further comprising:
prompting, in the display, a user of the mobile device to make a purchase of the object; and
storing information identifying the purchase in response to a user response to make the purchase via the mobile device.

14. The method of claim 13, further comprising:
determining, by the mobile application, an identity of a merchant based on the first location being within the predetermined geographical area associated with the merchant; and
performing, by the mobile application, an online transaction to complete the purchase in response to a determination that the current location of the mobile device is outside the predetermined geographical area.

15. The method of claim 14, wherein the data warehouse is coupled with a transaction handler of an electronic payment processing network and the transaction handler is configured to apply the benefit of the offer to the transaction when the transaction is being processed in the electronic payment processing network.

16. The method of claim 1, wherein the mobile device further has a user interface for the mobile application, the method further comprising:
in response to the second communication, generating, by the mobile application via the user interface, an alert.

17. The method of claim 1, wherein the mobile device further has a plurality of wireless communication devices configured to:
communicate with the wearable device via a wireless personal area network connection, wherein the wearable device is controlled at least in part by the mobile application via the wireless personal area network connection;
communicate, via a wireless connection, with the portal; and
communicate, via near field communication, with the transaction terminal.

18. At least one non-transitory computer-readable medium comprising instructions that, when executed by at least one microprocessor, cause the at least one microprocessor to:
store, in a memory of a mobile device, a mobile application configured to be executed by the at least one microprocessor of the mobile device, the mobile device having a location determination device configured to determine a current location of the mobile device, the location determination device comprising a global positioning system (GPS) receiver;
in response to a wearable device in communication with the mobile device capturing identification information of an object disposed at a first location:
transmit, by the mobile application, a first communication to a portal at a remote location, the first communication including identification information and configured to cause the portal to:

determine whether a data warehouse coupled with the portal is storing data in association with the identification information of the object, and in response to determining that the data warehouse is storing the data in association with the identification information of the object, transmit a second communication from the portal to the mobile application running in the mobile device;

provide, by the mobile application through the wearable device, a display based on the second communication in a virtual reality environment or an augmented reality environment implemented via the wearable device;

monitor, by the mobile application, the current location of the mobile device based on location data from the GPS receiver;

detect, by the mobile application, a third communication via near field communication between the mobile device and a transaction terminal at a second location;

determine, by the mobile application, the current location of the mobile device based on the location data from the GPS receiver is within a predetermined geographical area associated with the first location;

determine, by the mobile application, whether or not to transmit the identification information of the object to the transaction terminal at the second location via near field communication based on the current location of the mobile device based on the location data from the GPS receiver being within the predetermined geographical area associated with the first location and being in a vicinity of the transaction terminal at the second location at a time of the third communication; and transmit, by the mobile device via near field communication, the identification information of the object to the transaction terminal.

19. A mobile device, comprising:

a location determination device configured to determine a current location of the mobile device, the location determination device comprising a global positioning system (GPS) receiver;

at least one microprocessor; and a memory storing a mobile application configured to be executed by the at least one microprocessor, wherein, in response to a wearable device in communication with the mobile device capturing identification information of an object disposed at a first location, the mobile application is configured to:

transmit, by the mobile application, a first communication to a portal at a remote location, the first communication including the identification information and configured to cause the portal to:

determine whether a data warehouse coupled with the portal is storing data in association with the identification information of the object, and in response to determining that the data warehouse is storing the data in association with the identification information of the object, transmit a second communication from the portal to the mobile application running in the mobile device;

provide, through the wearable device, a display based on the second communication in a virtual reality environment or an augmented reality environment implemented via the wearable device;

monitor the current location of the mobile device based on location data from the GPS receiver;

detect a third communication via near field communication between the mobile device and a transaction terminal at a second location;

determine the current location of the mobile device based on the location data from the GPS receiver is within a predetermined geographical area associated with the first location;

determine whether or not to transmit the identification information of the object to the transaction terminal at the second location via near field communication based on the current location of the mobile device based on the location data from the GPS receiver being within the predetermined geographical area associated with the first location and being in a vicinity of the transaction terminal at the second location at a time of the third communication; and transmit, via near field communication, the identification information of the object to the transaction terminal.

20. The mobile device of claim 19, wherein the object is a physical object having attached thereon a bar code or a text string, and wherein the mobile application is configured to use the wearable device to capture an image of the bar code or the text string via a camera and determine the identification information of the object from the image, in response to a user of the mobile device interacting with the object in the augmented reality environment implemented via the wearable device.

* * * * *